Feb. 9, 1954     W. R. LUSTIG     2,668,320
HINGED LID AND HOOD SUPPORT FOR MOTOR VEHICLES
Filed Dec. 16, 1947     2 Sheets-Sheet 1
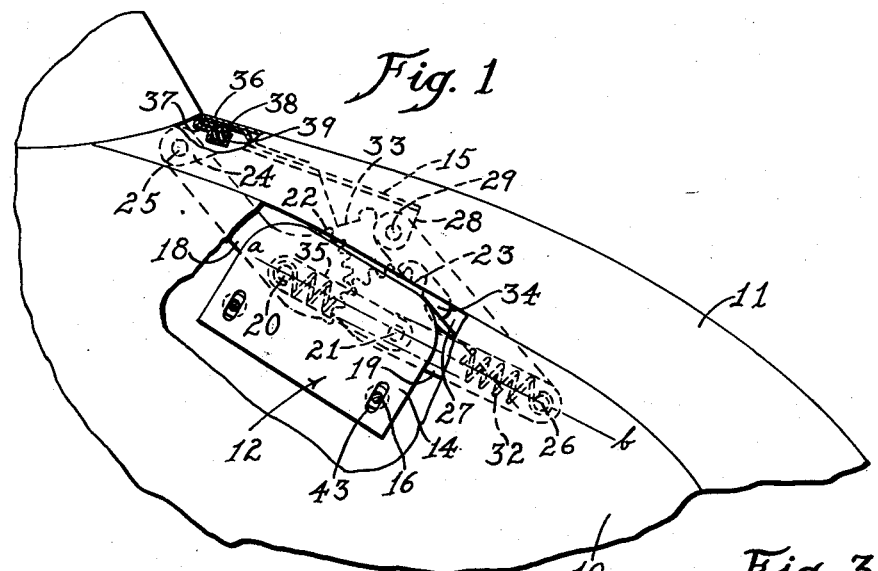
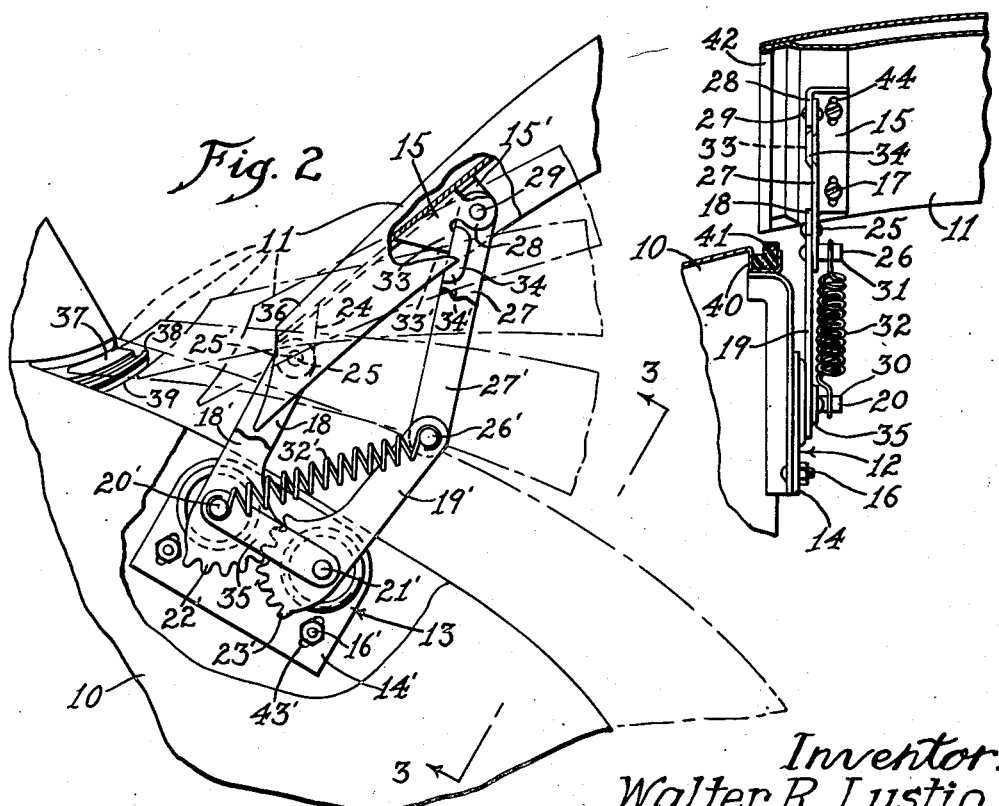
Inventor:
Walter R. Lustig

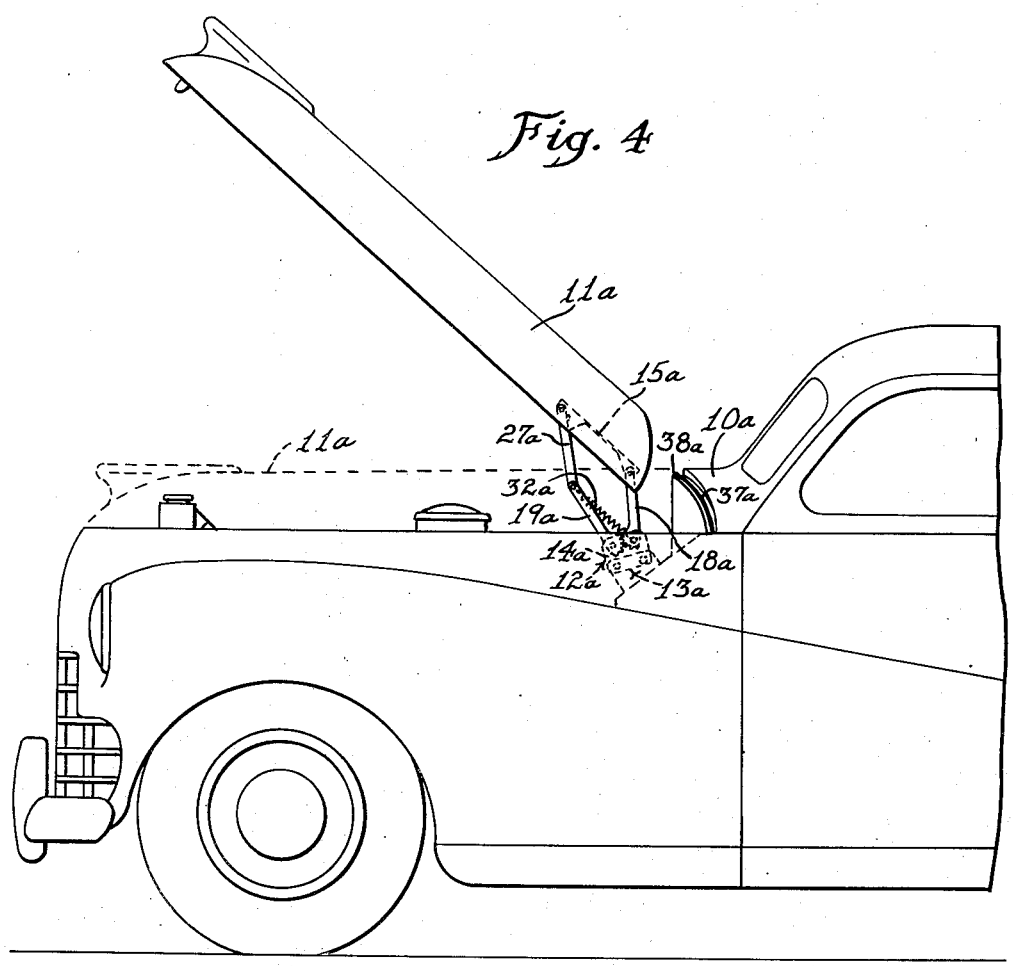

Patented Feb. 9, 1954

2,668,320

UNITED STATES PATENT OFFICE 2,668,320

HINGED LID AND HOOD SUPPORT FOR MOTOR VEHICLES

Walter R. Lustig, Rockford, Ill., assignor to Atwood Vacuum Machine Company, Rockford, Ill., a corporation of Illinois Application December 16, 1947, Serial No. 792,033

10 Claims. (Cl. 16—163)

1

This invention relates to improvements in hinge connections generally, and more particularly of the type in which the butt members are connected together by arms that are geared together for joint operation, the present devices having been designed more particularly for use either with the raisable and lowerable hood provided over the engine on the front of some of the later models of motor vehicles, or with the similarly operable lid provided on the rear trunk compartment of most motor vehicles, the invention being however, also applicable to any other hingedly supported member adapted to be operated in a similar way.

The hinge support of the present invention comprises two arms that are pivotally supported at one end in spaced relation on one of two butts and have gear segments on these ends in meshed relation, causing the arms to swing in opposite directions when the hinge is operated in either an opening or closing direction, as when a lid or hood to which the other butt may be attached is raised or lowered, one of the arms being pivotally connected to said other butt directly at one point thereon and the other having a link connection therewith at another point thereon, this construction being of special advantage for lids and hoods, for example, because of the way in which the hinged edge of such closure is first raised off its seat and sealing strip in the initial opening movement and lowered again onto said seat and sealing strip at the end of the closing movement, thereby enabling hinging of such closures where they are specially curved to conform to the curved contour of the vehicle body and where ordinary pintle hinges could not be used. The hinges provided heretofore to secure similar motion were usually of the complicated and expensive multiple link toggle construction, whereas the present hinge is of relatively simple and inexpensive construction.

An important advantage of the present hinges is the fact that in the closing of the lid on the trunk compartment, there are no parts of the hinges caused to swing downwardly into the trunk to give rise to the danger of damaging luggage therein.

Another advantage comes from a tension spring connected at one end to the fixed butt at the pivot of the one arm and at its other end to the outer end of the other arm, so that it is stretched in the lowering of the closure to more or less counterbalance the same against dropping violently, the line of action of the spring in the closed position of the closure being, furthermore, substantially on a dead-center with respect to the

2 arm to which it is attached, so that it offers substantially no resistance to the initial lifting of the closure and yet its full force promptly thereafter becomes available to assist in lifting said closure.

Still another advantage comes from the fact that the stationary butt is usually adjustably secured to the body, so that the raising and lowering movement of the hinged edge portion of the closure can be properly correlated to its ledge or seat on the body and the compressibility of the sealing strips that are interposed between the parts, usually on the ledge on the body, so that a good weather-tight seal is secured when the closure is closed, the adjustment also permitting an easy take-up to compensate for compression of or wear on the sealing strips after the car has been in service for some time.

The invention is illustrated in the accompanying drawings, in which—

Fig. 1 is a side view of the rear portion of an automobile, on which the lid of the trunk compartment, which is shown closed, is equipped with a pair of counterbalanced hinges made in accordance with my invention, as indicated partly in dotted lines and partly in elevation, where a portion of the body is broken away in order to make that possible;

Fig. 2 is a similar view showing the lid in full lines in open position, to illustrate by comparison with Fig. 1 the operation of the hinges of my invention, the lid being also indicated in dotted lines in several intermediate positions to show how its front end is raised in the initial opening movement for operating clearance relative to its ledge on the body as required for the further opening movement;

Fig. 3 is a cross-section on the line 3—3 of Fig. 2, showing the left hand hinge in rear view, and Fig. 4 is a side view of the front end of an automobile showing how the hinges of my invention are used in connection with the raisable hood for the engine compartment.

Similar reference numerals are applied to corresponding parts in these four views.

Referring first to Figs. 1 to 3, the reference numeral 10 designates the body of an automobile, and 11 the lid for the rear trunk compartment. There are two hinge connections or supports for the lid, the left hand one appearing in full lines at 12 in Figs. 1 and 3, and the right hand one at 13 in Fig. 2, the left hand unit being considered as broken away almost entirely in Fig. 2 to permit showing the right hand unit on the opposite side of the trunk compartment. Inasmuch as the right and left hand units are alike, except for "hand," I shall describe only the left hand unit, which appears mostly in Figs. 1 and 3, and apply the same reference numerals primed to corresponding parts in the right hand unit, appearing in Fig. 2. 14 and 15 designate the butts or plates fastened to the body 10 and lid 11, respectively, as by bolts 16 and 17, respectively. Two arms 18 and 19 are pivoted to the butt 14 on posts 20 and 21, respectively, and these arms have gear segments 22 and 23 formed on their pivoted ends, which are disposed in meshing engagement, so that the arms are compelled to turn simultaneously in opposite directions on their pivots when the lid 11 is raised or lowered, as will soon appear. The one arm 18 is pivotally connected directly to an ear 24 on one end of the butt 15, as shown at 25. The other arm 19 is pivotally connected by means of a pin, as at 26, to one end of a link 27, the other end of which has pivotal connection with an ear 28 on the other end of the butt 15, as indicated at 29. The pivots 20 and 26 have extensions, as shown at 30 and 31, respectively, in Fig. 3, and to these extensions are attached the looped opposite ends of a tension spring 32, which is stretched in the lowering of the lid, as will soon appear, to more or less counterbalance the same against dropping violently by gravity, and contrarywise assist later in lifting the lid. A limit stop 33 is provided in the form of a lug on the butt 15 adjacent the ear 28. This stop is arranged to be engaged by a laterally embossed portion 34 on the outer end of the link 27 when the lid 11 reaches the fully opened position shown in Fig. 2. When the lid is closed, as shown in Fig. 1, the line of action of the spring indicated at a—b is substantially on a deadcenter with respect to the arm 19 to which the spring is attached, so that the spring offers substantially no resistance to the initial lifting of the lid and yet its full force becomes available promptly thereafter to assist in lifting the lid. The spring, of course, has more and more mechanical advantage the farther the lid is raised, as should be evident from a comparison of Figs. 1 and 2, and that offsets the fact that the spring exerts less and less pull the farther the lid is raised. A cross-tie piece 35 disposed in spaced parallel relation to the butt 14 interconnects the pivots 20 and 21, and lies against the outer faces of the geared ends of the arms 18 and 19 to help to hold the pivots 20 and 21 rigidly in parallel relation and also serve as a guide to keep the geared ends of the arms 18 and 19 in full meshing engagement at all times.

In operation, when the lid 11 is closed, as shown in Fig. 1, its front end or hinged edge portion 36 overlies a ledge 37 projecting rearwardly and downwardly at an acute angle with respect to the horizontal and compresses a rubber sealing strip 38 which is supported in a channel 39 formed on the outer edge portion of the ledge 37. There is a continuation of this channel 39 along the opposite sides of the trunk compartment, as indicated at 40 in Fig. 3, and rubber sealing strips 41 are provided in these channels also and are compressed by the lateral edge portions 42 of the lid in its closed position, so as to seal the joints at those places also for protection of the luggage in the trunk compartment. The hinge units 12 and 13 have their butts 14—14' and 15—15' slotted, as indicated at 43 and 44, to permit up and down adjustment of the butts 14 and 14' relative to the body and fore and aft adjustment of the lid 11 relative to the butts 15 and 15'. In that way the raising and lowering movement of the hinged edge portion 36 of the lid can be properly correlated to the ledge or seat 37 on the body and also with respect to the compressibility of the sealing strips 38 and 41 that are interposed between the parts and thus assure a good weather-tight seal when the lid is closed, such adjustability also permitting an easy take-up to compensate for compression of or wear on the sealing strips after the car has been in service for some time. In the raising of the lid, due to the fact that the arms 18—18' swing upwardly immediately, the hinged edge 36 is first raised off the ledge 37 and sealing strip 38, as clearly appears in the dotted line intermediate positions shown in Fig. 2, so that the curved lid, the extent of the crown of which is evident from the side views thereof in Figs. 1 and 2, can have the hinging movement illustrated, the extent of curvature of the lid making ordinary or even specially designed pintle hinges impractical. It is important to note that in the closed position shown in Fig. 1, there are no parts of the hinge units projecting downwardly into the luggage space. Hence, there is no danger of scraping or even puncturing articles placed in the trunk compartment. The fact that the springs 32 and 32' are stretched in the lowering of the lid to the extent easily seen by comparison of Fig. 2 with Fig. 1 is of advantage not only from the standpoint of counterbalancing the lid against dropping violently by gravity, but also from the standpoint of assisting the operator in lifting the lid later, and, inasmuch as the line of action of the springs in their most extended condition, as shown at a—b in Fig. 1, is substantially on a dead-center with respect to the arms 19 and 19', these springs offer no appreciable resistance to the initial lifting of the lid and yet their pull becomes available promptly thereafter to assist in lifting the lid. The operator cannot damage the hinges by carelessly or recklessly operating the lid, because as soon as the links 27 and 27' strike the stops 33 and 33', in the manner shown in Fig. 2, there can be no further opening movement of the lid. In that way the gear segments 22—23 and 22'—23' are assured of remaining in meshed engagement.

In Fig. 4, I have shown the application of my invention to the hood 11a on the front end of an automobile, the body of which is indicated at 10a. Inasmuch as the hinges are of substantially identical construction to the units 12 and 13 just described, corresponding parts on the unit 12a have been numbered to correspond with the numbering of the unit 12 in Fig. 1, arms 18a and 19a corresponding to arms 18 and 19 in Fig. 1, and so forth. There are, of course, two hinge units 12a and 13a of left and right hand, but otherwise of identical construction, having one butt, like the butt 14a, mounted on the dash in opposite sides of the engine compartment and the other butt, like the butt 15a, attached to the under side of the hood 11a on opposite sides of the rear portion thereof. The ledge, over which the rear portion of the hood lies in its closed position, is indicated at 37a and the compressible sealing strip at 38a, there being other sealing strips corresponding to the strips 41 previously mentioned provided along opposite sides and across the front of the engine compartment to provide a weather-tight seal all around the hood in its closed position. The operation of the hinges in this application is substantially the same as described above for the lid application.

It is believed the foregoing description conveys a good understanding of the objects and advantages of my invention. The appended claims

I claim:

1. Means for pivotally connecting two members, comprising two arms pivoted at one end on the first of said members at two points in spaced relation and having gear connections at their pivoted ends so as to turn in opposite directions, one of said arms being pivotally connected at its free end to the second member at one point, a link pivotally connected at one end to the free end of the other arm and having its other end pivotally connected to the second member at another point in spaced relation to the other pivotal connection thereon, and a stop on the second member arranged to be engaged by said link when the members have been moved apart a predetermined distance, whereby positively to limit such movement.

2. Means for pivotally connecting two members, comprising two arms pivoted at one end on the first of said members at two points in spaced relation and having gear connections at their pivoted ends so as to turn in opposite directions, one of said arms being pivotally connected at its free end to the second member at one point, a link pivotally connected at one end to the free end of the other arm and having its other end pivotally connected to the second member at another point in spaced relation to the other pivotal connection thereon, and a tension spring connected at one end to the outer end of one of said arms and at its other end to the first member at a point so spaced from said arm that the spring is stretched in the swinging movement of said arms away from one another and reaches substantially a dead-center position relative to the arm associated therewith when the two pivotally related members reach an extreme position relative to one another.

3. In combination, a first butt adapted for association with one of two pivotally related members, a second butt associated with the other of said members, means forming a pivotal connection between said hinge butts comprising two arms pivoted at one end on the first of said butts at two points in spaced relation and having gear connections at their pivoted ends so as to turn in opposite directions, one of said arms being pivotally connected at its free end to the second butt at one point, a link pivotally connected at its one end to the free end of the other arm and having its other end pivotally connected to the second butt at another point in spaced relation to the other pivotal connection thereon, and a tension spring connected at its one end to the outer end of one of said arms and at its other end to the first butt at a point so spaced from said arm that the spring is stretched in the swinging movement of said arms away from one another and reaches substantially a dead-center position relative to the arm associated therewith when the two pivotally related members reach one of two extreme positions.

4. In combination, a first butt adapted for association with one of two pivotally related members, a second butt associated with the other of said members, means forming a pivotal connection between said hinge butts comprising two arms pivoted at one end on the first of said butts at two points in spaced relation and having gear connections at their pivoted ends so as to turn in opposite directions, one of said arms being pivotally connected at its free end to the second butt at one point, a link pivotally connected at its one end to the free end of the other arm and having its other end pivotally connected to the second butt at another point in spaced relation to the other pivotal connection thereon, a stop on the second butt arranged to be engaged by said link when the butts have been moved apart a predetermined distance, whereby positively to limit the opening movement, and a tension spring connected at its one end to the outer end of one of said arms and at its other end to the first butt at a point so spaced from said arm that the spring is stretched in the swinging movement of said arms away from one another and reaches substantially a dead-center position relative to the arm associated therewith when the two pivotally related members reach closed position.

5. A hinge comprising, in combination, a first hinge butt, a second hinge butt, and means forming a pivotal connection between said hinge butts comprising two arms pivoted at one end on the first of said butts at two points in spaced relation and having gear connections at their pivoted ends so as to turn in opposite directions, a post being included in the pivotal mounting of one of said arms on said first butt and that arm being pivotally connected at its free end to the second butt at one point, a link pivotally connected by means of a pin to the free end of the other arm and having its other end pivotally connected to the second butt at another point in spaced relation to the other pivotal connection thereon, and a tension spring connected at its opposite ends to said post and pin.

6. A hinge comprising, in combination, a first hinge butt, a second hinge butt, and means forming a pivotal connection between said hinge butts comprising two arms pivoted at one end on the first of said butts at two points in spaced relation and having gear connections at their pivoted ends so as to turn in opposite directions, a post being included in the pivotal mounting of one of said arms on said first butt and that arm being pivotally connected at its free end to the second butt at one point, a link pivotally connected by means of a pin to the free end of the other arm and having its other end pivotally connected to the second butt at another point in spaced relation to the other pivotal connection thereon, a tension spring connected at its opposite ends to said post and pin, and a stop on the second butt arranged to be engaged by said link when the butts have been moved apart a predetermined distance, whereby positively to limit the opening movement.

7. A pivotal connection and support means for two members comprising two arms each pivoted adjacent one end on the first of said members, a geared driving connection between said ends of the arms, one of said arms pivotally connected at its other end to the second member, and a link pivotally connected at one end to the free end of the other arm and at its other end to the second member.

8. Means for pivotally connecting two members, comprising two arms pivoted at one end on the first of said members at two points in spaced relation and having gear connections at their pivoted ends so as to turn in opposite directions, one of said arms being pivotally connected at its free end to the second member at one point, and a link pivotally connected at one end to the free end of the other arm and having its other end pivotally connected to the second member at another point in spaced relation to the other pivotal connection thereon.

9. Means for pivotally connecting two members, comprising two arms pivoted at one end on the first of said members at two points in spaced relation and having gear connections at their pivoted ends so as to turn in opposite directions, one of said arms being pivotally connected at its free end to the second member at one point, a link pivotally connected at one end to the free end of the other arm and having its other end pivotally connected to the second member at another point in spaced relation to the other pivotal connection thereon, and a tension spring connected at one end to the outer end of one of said arms and at its other end to the first member at a point so spaced from said arm that the spring is stretched in the swinging movement of said arms away from one another.

10. Means for pivotally connecting two members comprising two arms pivoted at one end on the first of said members at two points in spaced relation and having gear connections at their pivoted ends so as to turn in opposite directions, one of said arms being pivotally connected at its free end to the second member at one point, a link pivotally connected at one end to the free end of the other arm and having its other end pivotally connected to the second member at another point in spaced relation to the other pivotal connection thereon, a stop on the second member arranged to be engaged by said link when the members have been moved apart a predetermined distance, whereby positively to limit such movement, and a tension spring connected at one end to the outer end of one of said arms and at its other end to the first member at a point so spaced from said arm that the spring is stretched in the swinging movement of said arms away from one another and reaches substantially a dead-center position relative to the arm associated therewith when the two pivotally related members reach an extreme position relative to one another.

WALTER R. LUSTIG.

References Cited in the file of this patent
UNITED STATES PATENTS

| Number | Name | Date |
|---|---|---|
| 887,369 | Wilmot | May 12, 1908 |
| 1,087,709 | Blanchard | Feb. 17, 1914 |
| 1,593,923 | Carrier | July 27, 1926 |
| 2,091,673 | Orlow | Aug. 31, 1937 |
| 2,101,748 | Michel | Dec. 7, 1937 |
| 2,131,116 | Northup | Sept. 27, 1938 |